US008684406B2

(12) United States Patent
Bogenrieder et al.

(10) Patent No.: US 8,684,406 B2
(45) Date of Patent: Apr. 1, 2014

(54) AIRBAG AND METHOD FOR PRODUCING SUCH AN AIRBAG

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/578,314

(22) PCT Filed: Jan. 27, 2011

(86) PCT No.: PCT/EP2011/000357
§ 371 (c)(1),
(2), (4) Date: Sep. 24, 2012

(87) PCT Pub. No.: WO2011/098220
PCT Pub. Date: Aug. 18, 2011

(65) Prior Publication Data
US 2013/0033026 A1 Feb. 7, 2013

(30) Foreign Application Priority Data

Feb. 13, 2010 (DE) .......................... 10 2010 007 879

(51) Int. Cl.
*B60R 21/239* (2006.01)
*B60R 21/30* (2006.01)

(52) U.S. Cl.
USPC .................. 280/743.1; 280/738; 280/739

(58) Field of Classification Search
USPC ........... 29/890.124; 280/738–740, 742, 743.1
See application file for complete search history.

(56) References Cited

U.S. PATENT DOCUMENTS

| 3,887,213 | A | * | 6/1975 | Goetz | 280/738 |
| 4,111,458 | A | * | 9/1978 | Okada et al. | 280/739 |
| 4,360,223 | A | * | 11/1982 | Kirchoff | 280/729 |
| 4,500,114 | A | * | 2/1985 | Grey, Jr. | 280/742 |
| 4,805,930 | A | * | 2/1989 | Takada | 280/739 |
| 5,007,662 | A | * | 4/1991 | Abramczyk et al. | 280/739 |
| 5,246,250 | A | * | 9/1993 | Wolanin et al. | 280/739 |
| 5,533,753 | A | * | 7/1996 | Abraham | 280/739 |

(Continued)

FOREIGN PATENT DOCUMENTS

| DE | 199 11 082 A1 | 10/1999 |
| DE | 10 2006 043 552 A1 | 3/2008 |

(Continued)

OTHER PUBLICATIONS

International Search Report with English translation dated May 24, 2011 (six (6) pages).

(Continued)

*Primary Examiner* — Faye M Fleming
*Assistant Examiner* — Laura Freedman
(74) *Attorney, Agent, or Firm* — Crowell & Moring LLP

(57) ABSTRACT

An airbag with a valve device for a gaseous medium includes at least one textile layer and at least one foil that at least partially covers the textile layer such that due to the valve device at least one area of the airbag permeable by the medium can be at least partially opened when the valve device is in an open position and can be at least substantially sealed when the valve device is in a closed position.

6 Claims, 5 Drawing Sheets

(56) References Cited

U.S. PATENT DOCUMENTS

Figure 1:
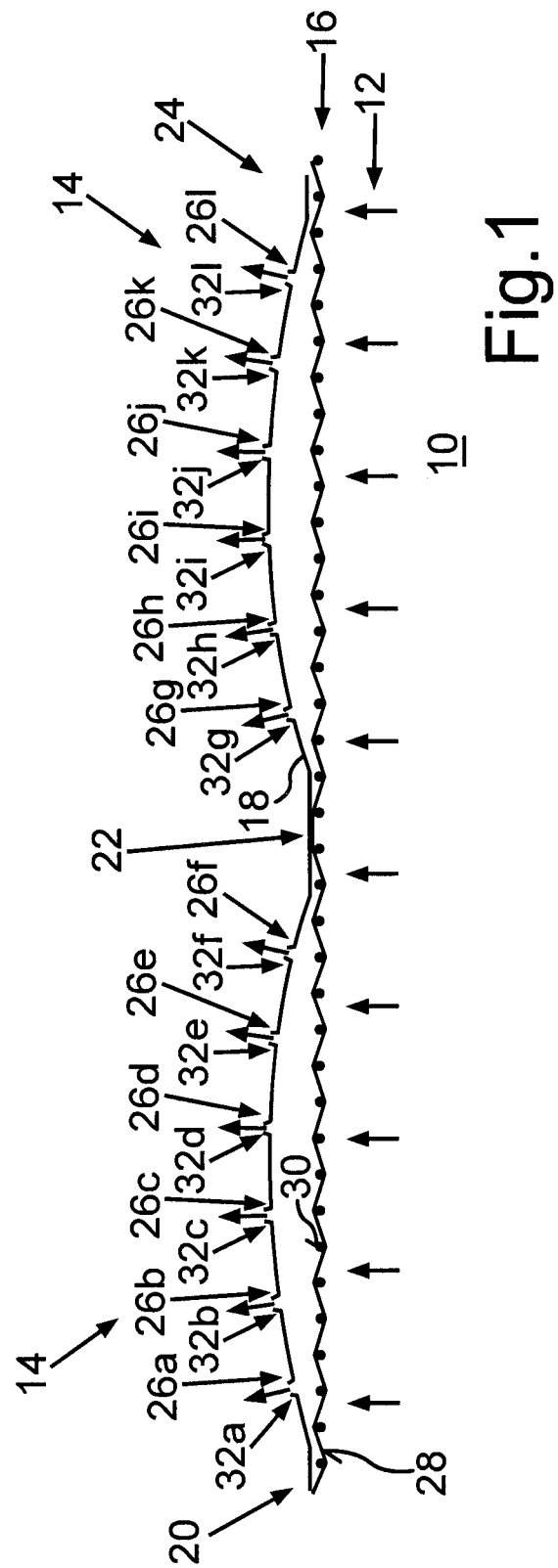

| | | | |
|---|---|---|---|
| 5,615,915 A * | 4/1997 | Magoteaux | 280/743.1 |
| 5,642,900 A * | 7/1997 | Patel | 280/728.2 |
| 5,669,628 A * | 9/1997 | Kaufmann et al. | 280/739 |
| 5,803,121 A * | 9/1998 | Estes | 137/849 |
| 6,017,057 A | 1/2000 | O'Docherty | |
| 6,726,242 B2 * | 4/2004 | Moon | 280/739 |
| 6,899,134 B2 * | 5/2005 | Breed et al. | 137/625.31 |
| 7,243,948 B2 * | 7/2007 | Aranzulla et al. | 280/743.1 |
| 7,475,906 B2 * | 1/2009 | Goto et al. | 280/743.2 |
| 8,403,362 B2 * | 3/2013 | Baumann et al. | 280/739 |
| 2003/0209895 A1 * | 11/2003 | Gu | 280/739 |
| 2008/0042416 A1 * | 2/2008 | Razazi et al. | 280/743.2 |
| 2008/0277912 A1 * | 11/2008 | Denys et al. | 280/739 |
| 2008/0315567 A1 * | 12/2008 | Fischer et al. | 280/732 |
| 2009/0243269 A1 | 10/2009 | Braun et al. | |
| 2013/0049337 A1 * | 2/2013 | Bogenrieder et al. | 280/743.1 |

FOREIGN PATENT DOCUMENTS

| | | | |
|---|---|---|---|
| DE | 102006043552 | * | 3/2008 |
| EP | 2 105 357 A1 | | 9/2009 |
| EP | 2105357 | * | 9/2009 |

OTHER PUBLICATIONS

German-language Written Opinion (form PCT/ISA/237) dated May 24, 2011 (six (6) pages).

"Porous Coated Airbag", Research Disclosure, Dec. 1, 2000, Mason Publications, vol. 440, No. 6 (two (2) pages).

* cited by examiner

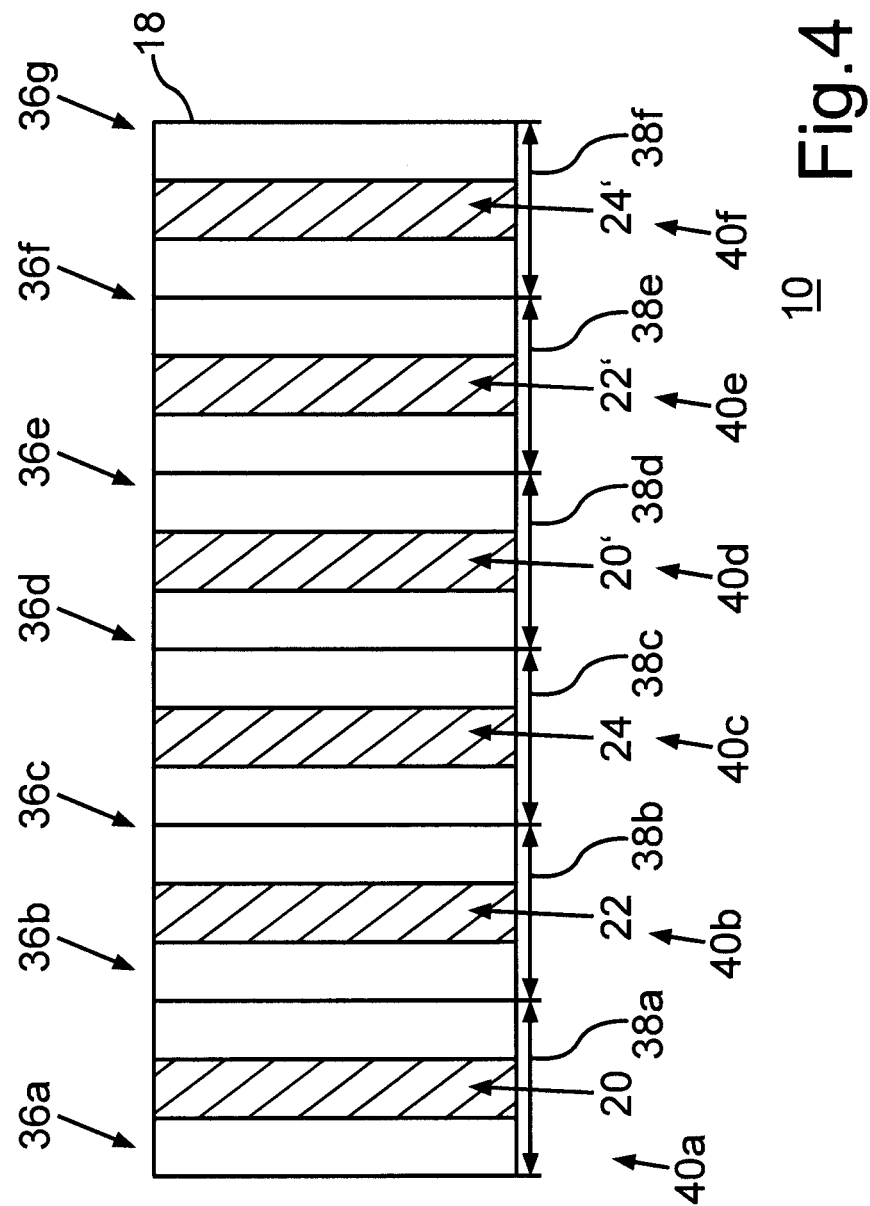

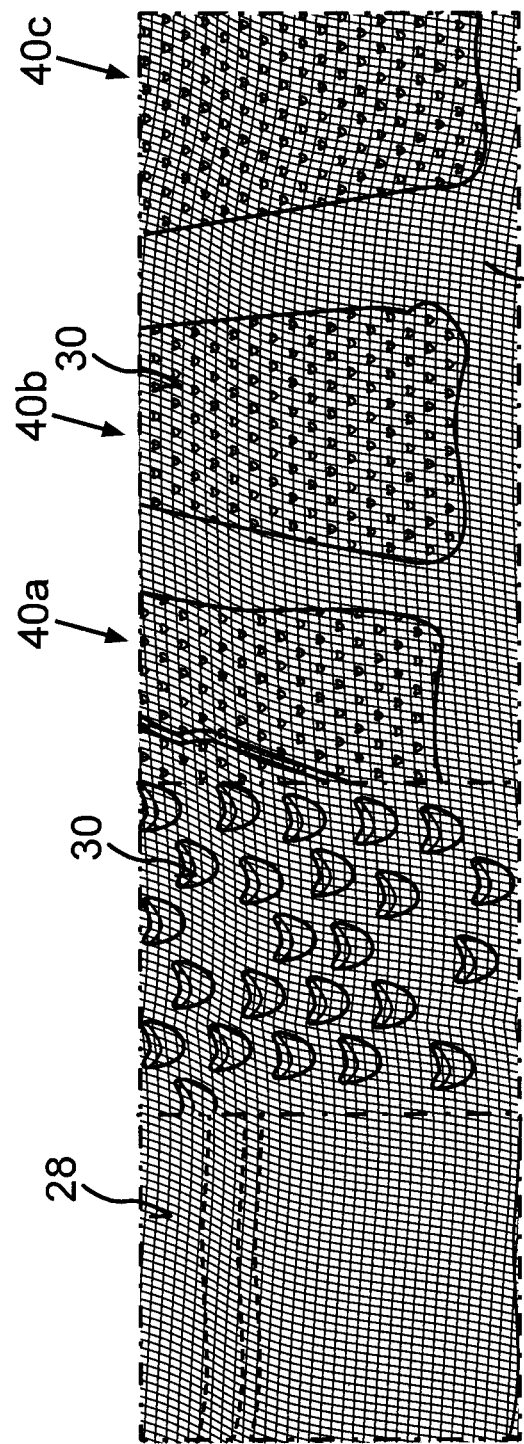

AIRBAG AND METHOD FOR PRODUCING SUCH AN AIRBAG

BACKGROUND AND SUMMARY OF THE INVENTION

Exemplary embodiments of the present invention are directed to an airbag and a method for producing such an airbag.

In the mass production of motor vehicles protective devices are known, which comprise air pouches, so-called airbags, which are constructed with a container of variable volume for air. In the event of an impact of the motor vehicle against a barrier, the airbags are inflated by a gas discharge in a very short time.

This serves the purpose of protecting occupants of the motor vehicle from impacting against components in a passenger compartment. This inflation and the protective function must take place very quickly, because there is very little time available for inflation in the event of such an impact. There is potential for reducing the cost of such airbags.

Exemplary embodiments are directed to an airbag, in particular an air pouch, and a method for producing such an airbag, which enable the airbag to be produced inexpensively.

An airbag, in particular an air pouch according to the invention, comprises a valve device for a gaseous medium, with at least one textile layer and at least one foil that covers at least some of the textile layer in such manner that by means of the valve device at least one area of the airbag permeable to the medium can be at least partially opened when the valve device is in an open position and can be at least substantially sealed when the valve device is in a closed position. In relation to the medium, the textile layer is, for example, designed to be permeable by the medium, whereas the foil is, for example, formed of a material that is essentially impermeable to the medium. In the open position the medium can therefore flow through the textile layer and through the permeable area. By integrating the valve function in the at least one foil and textile layer and integrating the valve device in the airbag, the airbag according to the invention has a very small number of parts and is therefore inexpensive. Moreover, not much complexity is involved in producing the airbag and this too reduces costs even more.

Since the foil is already provided in order to ensure that the airbag remains functional for a certain time, i.e., that it continues for a period of time to provide a supporting and therefore protective function for the occupants of a motor vehicle fitted with such an airbag, the airbag according to the invention can be produced in a small number of process steps and therefore quite quickly and inexpensively. Moreover, it takes up only little space and this avoids and/or solves stowing problems.

The valve function of the valve device comprising the textile layer and the foil is provided by the co-operation of the foil with the textile layer. In this, the foil functions as the flap of the valve device, which can influence or control the flow of the medium through the textile layer in one direction and in the direction opposite thereto. The textile layer functions as protection against puncturing the foil that acts as the flap, so that in the open position of the valve device the medium can flow in through the permeable area of the textile layer, while in the closed position of the valve device the flow of medium through the permeable area is at least substantially blocked.

Furthermore, the valve function of the valve device enables a large quantity or mass of the medium to flow particularly well, rapidly and efficiently through the valve device in a very short time, which is a great advantage since the airbag has to be filled very quickly with a minimum quantity of the medium, in particular air, in order to ensure a large and rapid volume increase to protect the occupants of a motor vehicle fitted with such an airbag.

In addition to this very advantageous functionality of the valve device in the airbag according to the invention, a further advantage is that it is only very light and takes up only a small volume when stowed. This is so because the foil and the textile layer are both extremely thin and their respective weights are very low. This also reduces the cost of the airbag according to the invention because both the foil and the textile layer, being products manufactured by the meter, can in each case be produced quickly and cheaply.

Thus, the airbag according to the invention is formed, for example, as a large, one-piece air pouch which, in its inflated condition, takes up a certain, desirably large volume in the inside space of the motor vehicle. In such an application the valve device serves during inflation or volume-enlargement of the airbag, to allow a desired mass or quantity of air to flow into the airbag when the valve device is in its open position. If the airbag is inflated and a passenger is thrown against it, then in its closed position the valve device keeps the air at least for the most part inside the airbag and prevents and outflow and/or too rapid an outflow of the medium out of the airbag, in order to ensure a certain, desired degree of support by the airbag.

Likewise, the airbag according to the invention can be in the form of a so-termed frame structure bag which, for example, has a frame structure consisting of a plurality of tube elements each of variable volume, which in the event of an accident-related force impact on the motor vehicle, are inflated so as also to occupy a certain volume in the inside space of the motor vehicle. Such a frame bag, compared with the above-described one-piece airbag, has advantages in that the frame structure occupies just as large a volume inside the vehicle and therefore has at least as good a supporting function as the first type of airbag, but has a smaller total volume that has to be acted upon, i.e., inflated by the medium. In other words, this means that the individual volumes of the tube elements, when summed, can be smaller than the volume of the large, one-piece airbag but despite this, by virtue of the frame structure formed by the tube elements, the frame bag occupies a volume at least equal to that of the one-piece airbag inside the vehicle and can thus have the same supporting and protective function for the occupants.

In this case the frame structure is clad with a cover, in particular made of fabric, to improve its supporting function, so that by virtue of the frame structure and the cover an inside space of the frame bag is formed, which is filled with a medium, for example air and in particular air from the surroundings, in order to further improve the supporting function of the frame bag. In this case the cover of the frame bag is advantageously formed at least in part by the textile layer and foil or the valve device of the airbag according to the invention, which makes it possible to fill the inside space delimited by the frame structure and the cover with a large quantity of medium, in particular surrounding air, in a short time. Thus, the inside space can be regarded as analogous to the large, one-piece and first-mentioned airbag, and provides at least the same supporting and protective function as the latter, whereas the frame bag can do this in a shorter time. Putting it the other way round, this means that in the same time it can expand to a larger volume than the aforesaid one-piece airbag and so provides a better supporting and protective action. Yet even with the large one-piece airbag the valve device provides the advantage that it can be inflated very quickly with a particularly large mass or quantity of the medium.

Inherent in the textile layer is the advantage that it forms a homogeneous surface which, if an occupant is thrown against it, avoids or at least reduces the risk of injury to the occupant, especially in the head area. In an embodiment of the invention the aforesaid permeation area is in the form of at least one gap in the foil, formed for example by perforation. This perforation can be produced, for example, during the production of the foil by means of a "porcupine" roller that forms a plurality of such perforations in the foil, resulting in particularly inexpensive production and enabling a very effective and good valve function of the airbag device.

In an advantageous embodiment of the invention at least one flap element that corresponds to the at least one perforation of the foil is provided, which in the at least temporary open position of the valve device leaves the at least one perforation at least partially unobscured, and in the closed position of the valve device at least partially blocks it. In this case the flap element is advantageously made integrally with the foil, so that again a small number of components, low weight and low costs of the airbag are entailed.

Alternatively or in addition, in another embodiment of the invention the permeable area is formed by at least one foil area that can be raised clear of the textile layer in the open position. To improve the sealing action in the closed position, in one embodiment this is closed off by at least two foil areas that overlap when the valve device is in the closed position. This means that the foil has at least two overlapping areas, which in turn cover an area of the textile layer. The overlapping foil areas at least partially leave clear the textile layer when the valve device is in the open position and at least substantially closes it when the valve device is in the closed position. On the one hand this enables a particularly efficient and very good flow of the medium through the valve device, and on the other hand particularly efficient and effective blocking of the flow in the corresponding opposite flow direction of the medium.

The invention also relates to a method for producing an airbag, in particular a bag for gas, with a valve device for a gaseous medium, having at least one textile layer and at least one foil arranged to cover at least part of the textile layer. By means of the valve device at least one area of the airbag permeable by the medium can be opened at least partially when the valve device is in an open position, and can be at least substantially sealed when the valve device is in its closed position. Advantageous design features of the airbag according to the invention should be viewed as advantageous features of the method according to the invention, and conversely.

The foil is, for example, laminated onto the textile layer, bonded to the textile layer in some areas and/or stitched thereto, and advantageously, already during these or any other ways of joining the foil to the textile layer, it is designed to form the valve device. This entails an integration and thus parallelization of production steps, which keeps down the production time and thereby reduces the production costs for the airbag made by the method according to the invention. Thus, the method according to the invention also makes it possible to produce an inexpensive airbag that nevertheless ensures very good functionality for the protection of occupants of a motor vehicle fitted with such an airbag.

If the permeable area is in the form of at least one opening in the foil, then this is produced, for example, as a perforation by means of a porcupine roller which perforates the foil of the valve device of the airbag according to the invention, for example while it is being laminated onto the textile layer.

Further advantages, features and details of the invention emerge from the following description of a number of preferred example embodiment and with reference to the drawing. The features and combinations thereof mentioned in the description above, and below in the description of the figures, and/or those illustrated in the figures alone, can be used not only in the combinations specifically indicated but also in other combinations or in isolation, without going beyond the scope of the invention.

BRIEF DESCRIPTION OF THE DRAWING FIGURES

Figure 2:
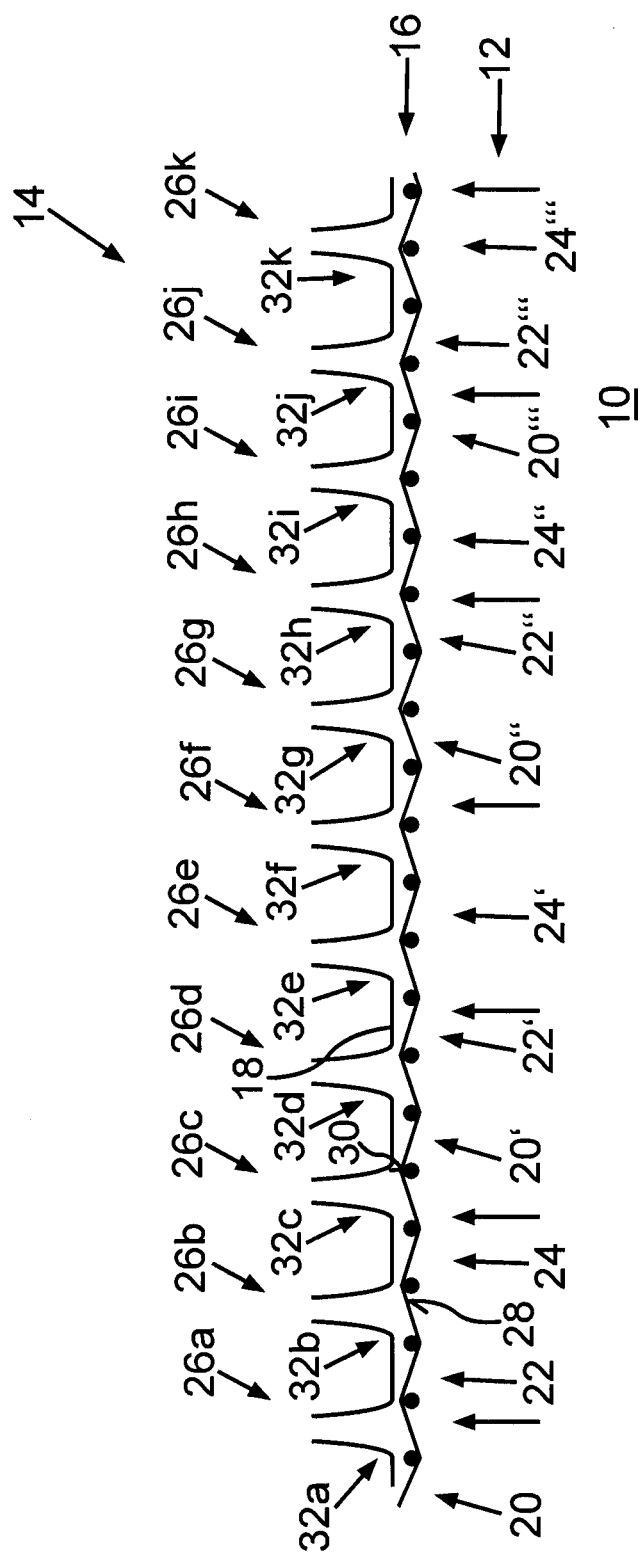
Figure 3:
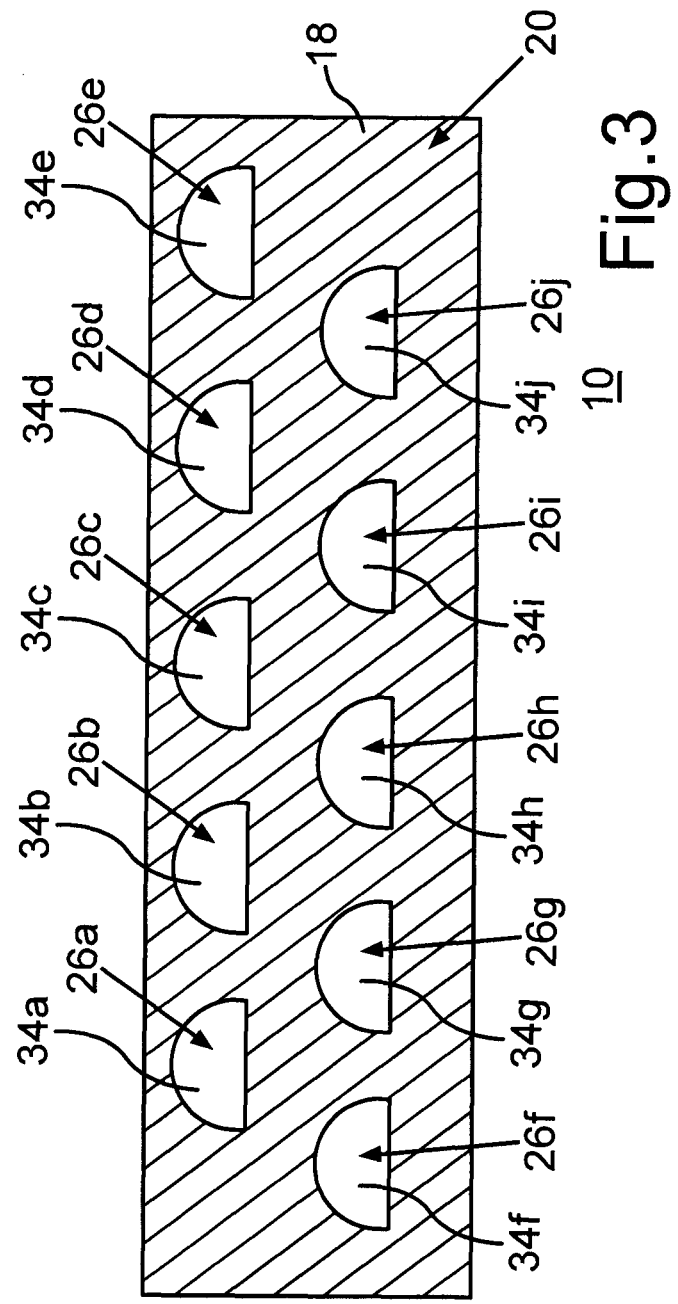

The drawings show:
FIG. 1: A schematic sectioned view of an embodiment of the airbag according to the invention;
FIG. 2: A schematic sectioned view of another embodiment of the airbag according to the invention;
FIG. 3: A schematic overhead view of a further embodiment of the airbag according to the invention;
FIG. 4: A schematic overhead view of a further embodiment of the airbag according to the invention;
FIG. 5: A cutaway portion of a schematic overhead view of an outside of the airbag according to the invention shown in the previous figures;
FIG. 6: A cutaway portion of a schematic overhead view of an inside of the airbag according to the invention shown in FIG. 3; and
FIG. 7: A cutaway portion of a schematic perspective view of an inside of the airbag shown in FIG. 4.

DETAILED DESCRIPTION

FIG. 1 shows an airbag 10 into which, when the volume of the airbag 10 increases, in particular when it is inflated in the event of a force impact caused by an accident of a motor vehicle fitted with the said airbag 10, air flows into the airbag 10 in the direction shown by the arrows 12 and 14.

The airbag 10 comprises a valve device with a textile layer in the form of a fabric 16 permeable to air, which consists of a large number of threads woven together. In addition the valve device comprises a foil 18, which is joined in some areas 20, 22 and 24 to the fabric 16, for example bonded and/or stitched to it. The fabric 16 functions as a supporting tissue to ensure a certain consistency of shape and the provision of some strength of the airbag 10.

By means of the valve device for the air flowing into the airbag 10 when it is inflated, areas 26a-l of the airbag 10 permeable to air can be at least partially opened when the valve device is in its open position and at least substantially sealed when the valve device is in its closed position. This prevents an outflow, or too rapid an outflow of air from the airbag 10, in order to ensure a desired and specified period of inflation for the airbag 10, for the support of occupants of the motor vehicle.

The perforations 26a-l are formed by means of a porcupine roller that perforates the foil 18, for example before the foil 18, which is made for example mainly from silicone, has been joined to the supporting fabric 16. The foil 18 can be made at least substantially from polyester-polymethane and/or a fluoropolymer and can have a thickness in the range 25 µm to 300 µm inclusive. The foil 18 is made, for example, in strips 19 cm wide and joined, for example stitched to the fabric 16 in corresponding edge areas.

As can be seen in FIG. 1, when the airbag 10 is activated and deployed by the air flowing into it as indicated by the direction arrows 12 and 14, in areas other than the areas 20, 22 and 24, namely in areas where the foil 18 is not joined to the fabric 16, the foil rises clear of the fabric 16 and expands. As a result the perforations 26a-l widen and open up, which enables a large quantity or mass of air to flow into the airbag in a short time.

At this point it should be noted that the airbag 10 is, for example, in the form of a large air pouch. If the airbag 10 is inflated and an occupant is thrown against it from the outside 28 of the airbag 10 in the direction indicated by the arrows 12, then the foil 18 encounters the fabric 16 so that the expansion of the foil 18 is less than when air is flowing into the airbag 10 and therefore flowing through the valve device. The fabric 16 thus also provides a reaction function of the valve device, because on impact an outflow too rapid an outflow of air from the airbag 10 is prevented, which ensures a substantial inflated time and hence a good supporting function of the airbag 10. This is further assisted by the fact that the openings 26a-l formed by perforation, which are arranged on the inside 30 of the airbag 10 and face away from the outside 28, open inwards and thus enhance the sealing effect, because they are pressed together by the rising internal pressure in the airbag 10. This pressing together takes place because each opening 26a-l comprises a short projection 32a-l, which extends away from the fabric 16 and thus in the flow direction of the air when it is flowing in along the direction of the arrows 12 and 14.

FIG. 2 shows an alternative embodiment of the airbag 10, the same indexes being used to denote the same elements. The projections 32a-k of the openings 26a-k are now in the form of essentially tubular sections, each with a cross-section that tapers down from the fabric 16 toward the inside 30, so that the said projections 32a-k are partially of conical shape.

To produce such a surface pattern the foil 18 is made, for example, from a thermoplastic elastomer and deep-drawn. It can also be made by a plastic molding process.

In the airbag 10 according to FIG. 2 as well, the foil 18 is joined to the fabric 16 in areas 20, 20', 20", 20'", 22, 22', 22", 22'", 24. 24', 24" and 24'", for example by bonding and/or stitching. In other respects what was said about the airbag 10 of FIG. 1 applies by analogy to the airbag 10 of FIG. 2. Accordingly, the airbag 10 of FIG. 2 also opens and closes the valve device particularly rapidly and a large quantity or mass of air can therefore flow through it into the airbag 10 in a very short time, since the valve devices have particularly low wall roughness in the openings 26a-l, which influences the pressure-loss coefficient. This enables a particularly high volume flow to take place while air is flowing through or in, and very good sealing when the fabric 16 is stressed by the occupants when they sink into it.

FIG. 3 shows a further embodiment of the airbag 10, the foil 18 being schematically represented in the figure. In this case the foil 18 is bonded to the fabric 16 (not visible in FIG. 3) in the shaded area 20. The foil 18 can also be joined to the fabric 16 by stitching. The openings 26a-j of the foil 18 are in this case each covered by a flap element 34a-j, these being formed by, and therefore integrally with, the foil 18 by corresponding flap-shaped cuts in the foil 18. The curved flap elements 34a-j are produced, for example, by stamping. The flap elements 34a-j covering the openings 26a-j are not bonded or joined in any other way to the fabric 16, so that when the valve device is in its open position they leave clear the openings 26a-j and thus allow air to flow through the valve device and inwards into the airbag 10, whereas when the valve device is in the closed position they at least substantially prevent the air from flowing out. In other respects what was said about the airbag 10 of the previous figures applies also to the airbag 10 of FIG. 3.

FIG. 4 shows another embodiment of the airbag 10, wherein a flow of air through the valve device and hence into the airbag 10 is ensured by way of permeable areas 36a-g. The airbag 10 of FIG. 4 in this case comprises a plurality of foil strips 40a-f, each with a certain strip width 38a-f. Thus, the foil strips 40a-f can be regarded as respective, individual foils, which are connected to the fabric 16 for example by bonding, in the shaded areas 20, 20', 22, 22' 24, 24'. In the permeable areas 36a-g the foil strips 40a-f are not joined to the fabric 16 and thus, when the valve devices are in the open position, they allow air to flow through the valve devices and therefore into the airbag 10. Since the foil strips 40a and 40b in the permeable area 36b, the foil strips 40b and 40c in the permeable area 36c, the foil strips 40c and 40d in the permeable area 36d, the foil strips 40d and 40e in the permeable area 36e, and the foil strips 40e and 40f in the permeable area 36f, overlap one another, in the closed position of the valve device the sealing of the said permeable areas 36b-f is improved and throughflow of the air and its outflow from the airbag 10 is avoided or further impeded, so that the time during which the airbag 10 remains effective is extended.

FIG. 5 shows the outside 28 of the airbag 10 illustrated in the preceding figures, against which an occupant, in particular his head, comes into contact with the airbag 10 and hence with the fabric 16 thereof.

FIG. 6 shows a cutaway portion of the inside 30 of the airbag 10 in FIG. 3, wherein a plurality of curved flap elements 34a-j can be seen. The flap elements 34a-j each have an area of around 44 mm$^2$, corresponding in various patterns with an opening cross-section of the valve device amounting to 34% to 44% inclusive of the total area of the valve device.

FIG. 7 shows the inside 30 of the airbag 10 of FIG. 4, wherein the essentially rectangular foil strips 40a-c can be seen, which are joined to the fabric 16 in the manner explained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag with a valve device for a gaseous medium, the valve device comprising:
   a textile layer; and
   a foil that covers the textile layer in at least one area,
   wherein the textile layer and foil are configured such that at least one area of the airbag permeable by the medium is at least partially opened when the valve device is in an open position and is at least substantially sealed when the valve device is in a closed position,
   wherein the at least one area permeable by the medium is in the form of at least one opening in the foil,
   wherein the at least one area permeable by the medium of the foil is formed by perforation,
   wherein the perforation has a projection in an edge area of the at least one opening that extends away from the textile layer, and
   wherein the textile layer is an air permeable fabric and the textile layer and foil are configured with respect to each other so that (1) air from an environment passes through the air permeable fabric into the airbag and towards the foil so that the valve device is in the open position, and (2) a force acting on an outside of the textile layer moves the textile layer towards the foil so that the valve device is in the closed position.

2. The airbag according to claim 1, wherein connection areas are arranged in the at least one area of the foil that covers the textile layer, wherein the connection areas are bonds or stitches between the textile layer and the foil, and wherein the connection areas are a distance apart from one another.

3. The airbag according to claim 1, wherein the projection is an essentially tubular projection that at least partially surrounds the at least one opening, and wherein the essentially tubular projection is arranged in an edge area of the at least one opening.

4. The airbag according to claim 3, wherein the projection has a tapering cross-section.

5. An airbag with a valve device for a gaseous medium, the valve device comprising:
   a textile layer having a first side arranged to face a vehicle passenger and an opposed second side; and
   a foil that covers the textile layer in at least one area on the opposed second side of the textile layer,
   wherein the textile layer and foil are configured such that a plurality of areas of the airbag permeable by the medium are at least partially opened when the valve device is in an open position and are at least substantially sealed when the valve device is in a closed position,
   wherein each of the plurality of areas permeable by the medium is an opening in the foil,
   wherein the foil includes a plurality of flap elements, each of which correspond to one of the plurality of openings in the foil, the plurality of flap elements are configured to leave the corresponding one of the plurality of openings at least partially clear when the valve device is at least temporarily in the open position, and at least partially seals the corresponding one of the plurality of the openings when the valve device is in the closed position, and
   wherein the textile layer is an air permeable fabric and the textile layer and foil are configured with respect to each other so that (1) air from an environment passes through the air permeable fabric into the airbag and towards the foil so that the valve device is in the open position, and (2) a force acting on an outside of the textile layer moves the textile layer towards the foil so that the valve device is in the closed position.

6. An airbag with a valve device for a gaseous medium, the valve device comprising:
   a textile layer having a first side arranged to face a vehicle passenger and an opposed second side; and
   a plurality of overlapping foil strips that respectively cover areas of the textile layer on the opposed second side of the textile layer,
   wherein the textile layer and the plurality of overlapping foil strips are configured such that a plurality of areas of the airbag permeable by the medium are at least partially opened when the valve device is in an open position and are at least substantially sealed when the valve device is in a closed position.

* * * * *